3,816,632
PREPARATION OF A TUBULAR
COLLAGEN CASING

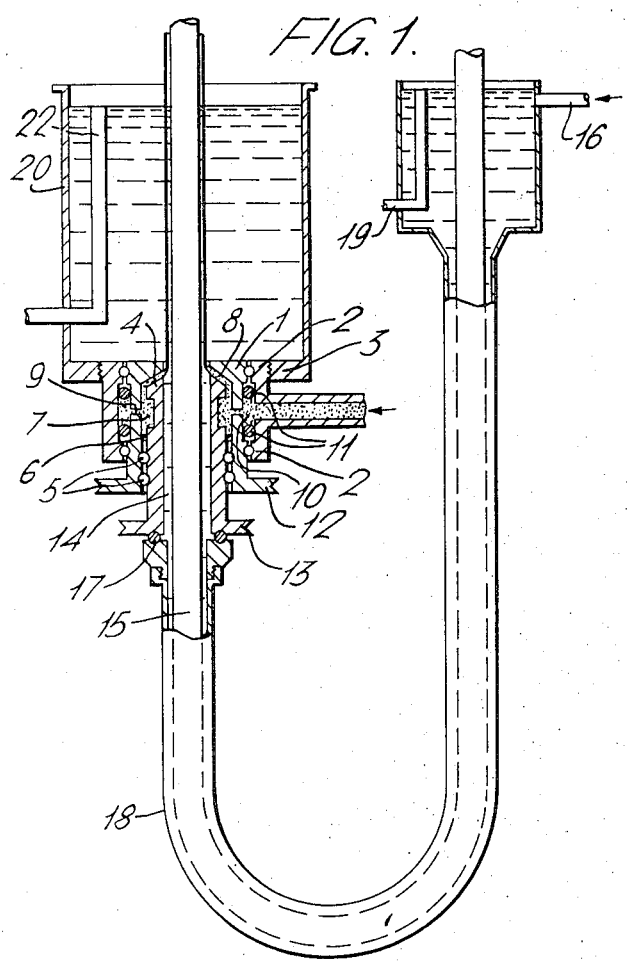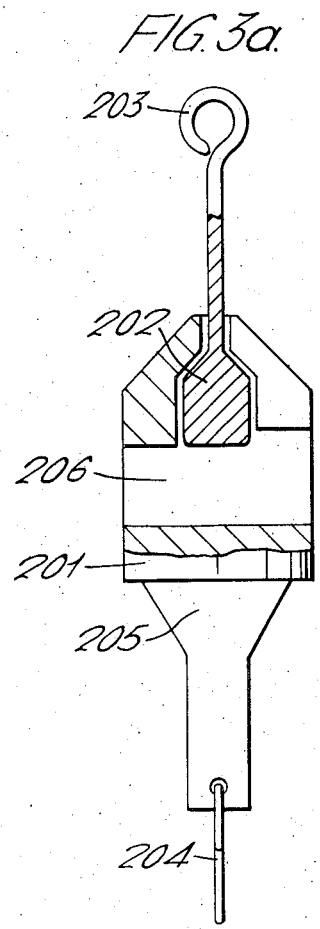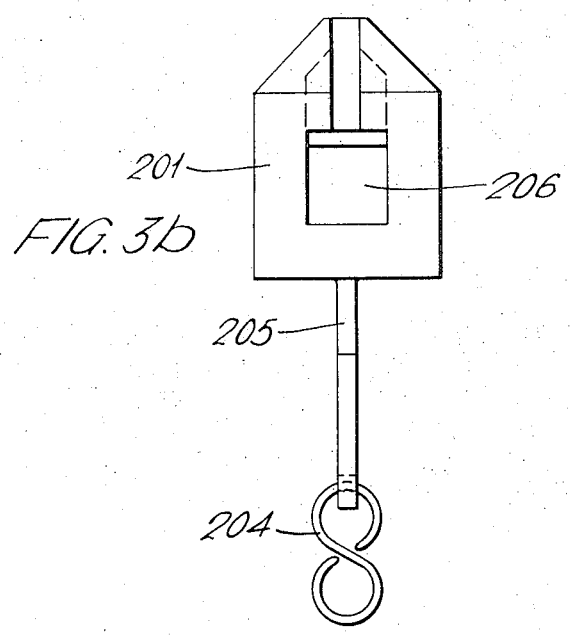

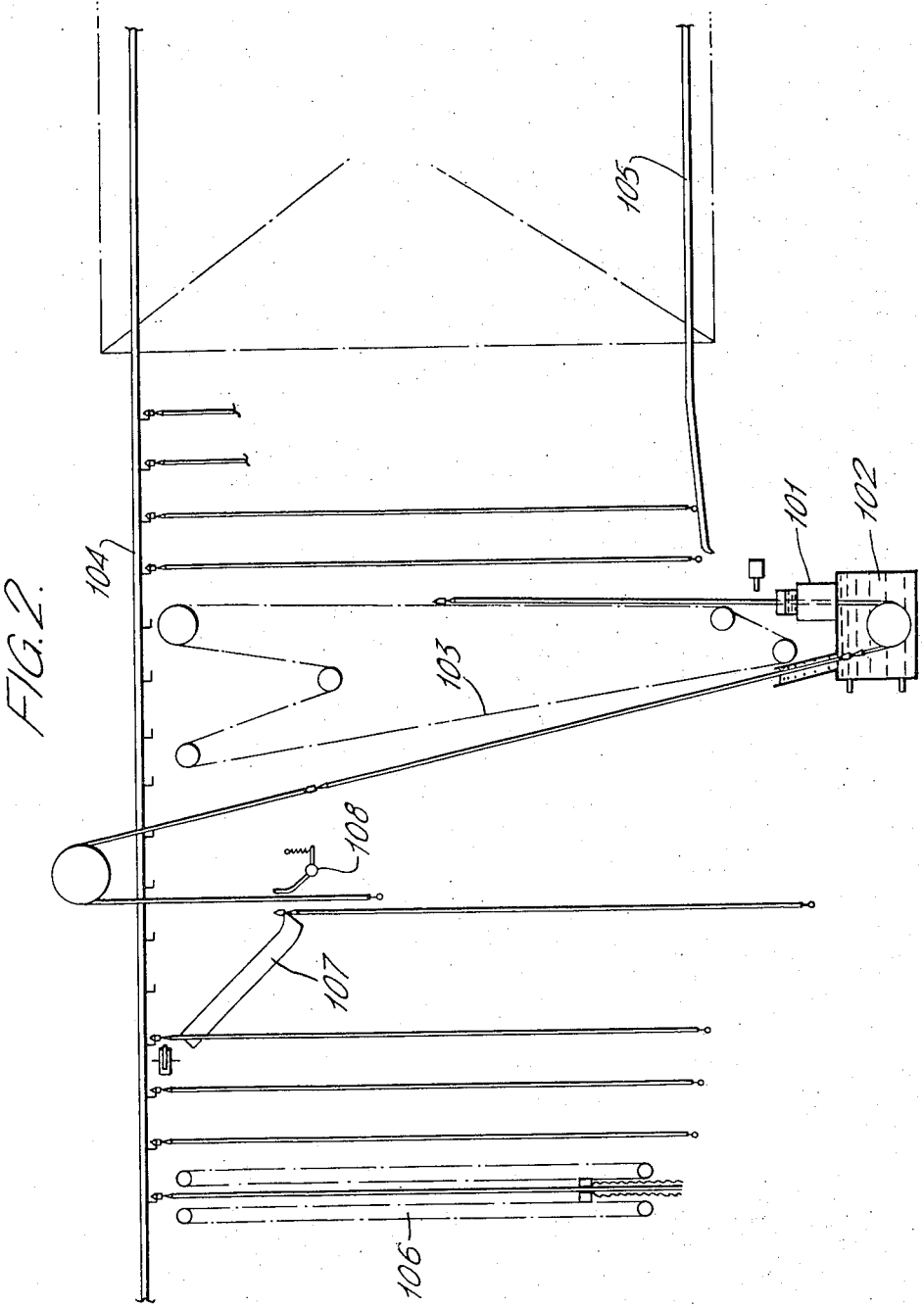

Maxwell Charles Hamlyn, Surrey, and Allan James Kidney and Alexander Owen, London, England, assignors to Lever Brothers Company, New York, N.Y.
Application Mar. 15, 1971, Ser. No. 124,456, which is a continuation of application Ser. No. 743,265, June 7, 1968, both now abandoned. Divided and this application Feb. 12, 1971, Ser. No. 115,133
Int. Cl. A22c 13/00
U.S. Cl. 99—176                5 Claims

ABSTRACT OF THE DISCLOSURE

Tubular casing, particularly collagen sausage casing, is produced by extrusion through a nozzle through which a templet or former substantially of the dimensions required in the finished casing is being passed, the casing being received onto the former immediately upon extrusion.

---

This is a divisional application of Ser. No. 124,456, now abandoned filed Mar. 15, 1971, which is a continuation of application Ser. No. 743,265, now abandoned and filed June 7, 1968.

The invention relates to the production of tubular casings, particularly sausage casings.

Our co-pending British Patent Application No. 189/66 describes and claims a process for treating a flexible tubular casing, particularly a sausage casing, in which the casing is formed by extrusion and then disposed on a former or templet and subjected to drying or other treatments while on the templet. In particular the templet may be an inflatable tube, fed through the centre of the inner part of an extrusion nozzle by means of which casing is being formed from bulk material, and subsequently inflated to support the casing.

We have now found that it is desirable to use a former that is passed through the nozzle substantially at its final size, and in particular that the inflatable tubes are advantageously inflated or otherwise erected before passing them into the extrusion nozzle. The use of such formers gives closer control over the formation of the casing, particularly in respect of diameter, and supports it almost from the moment of its extrusion so that a dough which is, for example, not quite homogeneous can still form a good casing.

The invention accordingly provides a process for the preparation of a tubular casing from bulk material, which includes the steps of:

(i) forming the casing by extrusion of the material through an annular nozzle,
(ii) while forming the casing, passing axially through the nozzle at a rate consistent with the rate of formation of the casing a former which conforms in external dimensions substantially to the dimensions of the casing required,
(iii) receiving the casing onto the former,
(iv) subjecting the casing while on the former to strengthening treatment.

The invention moreover provides an extruder and plant suitable for carrying out the process of the invention.

The extruder comprises inner and outer members defining an annular extrusion nozzle, the inner member having an axial bore of sufficient size to allow passage of a former conforming in external dimensions substantially to the desired dimensions of the casing. Preferably, for extrusion of collagen dough, the inner and outer members are contra-rotatable, to give strength to the casing by cross-orientation of the fibres and fibrils in the dough.

The plant essentially comprises an extruder, means for feeding bulk material to the extruder, means for passing the former through the bore in the nozzle of the extruder to receive casing formed by the nozzle, and means for subjecting the casing while on the former to strengthening treatment. For automatic operation the plant desirably has in addition means for connecting a series of templets end to end to allow continuous passage of the series through the nozzle, means for parting the casing where the templets are connected to each other, means for removing the treated casing from the former and means for disconnecting the templets from each other after the removal of the casing.

The following description is largely in terms of formers consisting of inflated tubing, and referred to as templets. However, other kinds of former can be used, for example tubing erected by being filled with a flexible, elastic material, for example a plastics foam. Suitable polyurethane foams may be used.

The former should preferably be made of a material that, while flexible, maintains its dimensions when handled and also preferably has a surface such that the casing can readily be removed, for example by shirring for sausage casing. The material should moreover preferably be tough enough to stand up to repeated handling and, where the former is inflated tubing, capable of being conveniently sealed, for example by heat; tubular films of plastics material, for example nylon 11, are suitable. Nylon 11 tubing may be passed through the apparatus described below at least ten times with normal care.

A suitable wall thickness is 0.06 mm. though thicker tubing can be used and will have a lesser tendency to develop pinholes.

Where nylon tubing is used it should preferably be fed into the extruder without allowing kinking since once kinked at a particular point, the tubing tends to kink again at the same point in subsequent runs, develops pinholes and deflates. However if a thin-walled rubber lining tube is inserted in the nylon tubing and inflated, less care is necessary since the pinholes become unimportant. The same principle can be used with other materials, the material of the lining tube being selected so that pressure is maintained and the material of the former itself being selected for dimensional stability and ready shirring, as already noted. The lining tube, like the templet tubing itself, should be flexible.

The pressure in the templet tubing when it is used as such or with a lining tube, should be high enough for it to maintain its inflated shape but not so high that it is no longer flexible and therefore no longer easily compressed over a short portion of its length. The flexibility and compressibility are desirable for convenient passage of the tubing through the extruder and for ready shirring of the finished casing. A suitable pressure is 30 cm. water gauge, but somewhat lower pressures can be used, depending on the depth of setting solution in the setting bath, or somewhat higher pressures, for example 50 cm. water gauge.

In the preparation of sausage casings the bulk material is a collagen dough and the extrusion takes place into a bath of setting solution surrounding the nozzle. Conveniently the dough contains 4 to 7% solids by weight, preferably 4.5 to 6%. The setting solution is preferably saturated brine, pumped continuously to surround the extruded casing and precipitate the collagen from the heavily hydrated uniform translucent form present in the dough to the coherent whitish form constituting the newly formed casing. Other setting solutions can however be used, for example ammonium sulphate solution or methanol/ammonia setting solution. A setting bath depth of six or ten inches is normally adequate, but the action of the bath can be supplemented by subsequent spraying with setting solution if desired. The limit to the depth of the bath is set by the hydrostatic pressure exerted by the setting solution which would collapse an inflated templet if it were too high. Preferably a small quantity of setting solution is in addition caused to surround the templet as it passes through the nozzle, so that before being received onto the templet the extruded casing is subjected to the action of the setting solution on both sides. Only a small part of this setting solution in fact remains between the casing and the templet once it emerges from the bath. The solution surrounding the templet should preferably be supplied at a pressure very slightly above the hydrostatic pressure exerted by the setting solution in the bath at the level of the nozzle; setting solution is then present on both sides of the casing until the casing emerges from the setting bath. The pressure is satisfactory when the casing can be seen to be expanded slightly away from the templet for the first 2 to 5 cm. above the surface of the setting bath.

The temperature of the dough and setting solution can be ordinary ambient factory temperature, say 15° to 25° C. Lower temperatures may increase the viscosity of the dough without compensating advantage, while higher ones, over about 30° C. have a bad effect on the collagen. The extrusion pressure is chosen according to the plant in use; pressures of 80 to 120 p.s.i. (5.5 to 8.5 kg./sk. cm.) are for example suitable. The extruder itself is preferably a contra-rotating head extruder, particularly one having contra-rotating cones between which the dough passes. The preferred gap between the cones in 15 to 20 thousandths of an inch (0.35 to 0.5 mm.), but other gaps, for example between 10 and 25 thousandths of an inch (0.25 to 0.60 mm.) can be used. The cones of the extruder are preferably rotated at the same speed as each other or with about 10 or 15 r.p.m. difference. Various speeds of rotation can be used, for example 60 to 120 r.p.m.

The chosen rate of extrusion of the dough and the corresponding rate of passage of the templet can be over a considerable range, from rates as low as 5 or 6 feet/min. (2.5 cm./sec.) up to 45 feet/min. (22 cm./sec.) or under suitable circumstances up to, for example, 100 feet/min. (48 cm./sec.), according to the handling arrangements adopted.

The diameter of the finished casing naturally depends in part on the diameter of the extrusion nozzle but a considerable variation below the maximum size available from a given nozzle is possible, depending on the size of templet used. A nozzle just capable of passing a templet constituted by 28 mm. lay flat tubing (18 mm. diameter, inflated) can for example be fed with 25 mm. tubing (16 mm. diameter, inflated); the extruded casing is easily made to shrink onto it. Under suitable circumstances a nozzle capable of passing 36 mm. templet tubing (23 mm. inflated) will moreover produce casing on, for example the 25 mm. tubing.

The templet tubing is conveniently used in lengths of about 25 feet (7.5 m.) since conventional stuffing machines take about this much of the formed casing in its final shirred form and handling in the pre-drying, washing and final drying operations that follow extrusion is convenient. The plant can however be designed to handle the tubing, with the casing on it, continuously until the casing is finished and can be shirred off in convenient lengths. The pre-drying and subsequent steps can be done over any convenient period, for example a day pre-drying is still air, five or ten minutes washing with water sprays to remove most of the salt still in the casing when a brine setting bath is used, and drying for a further day. If forced-draught drying is used air warmed for example to 40° or 50° C. is satisfactory and twenty minutes for each drying stage, or even less, is usually adequate. After the second drying if necessary the casing is conditioned under controlled relative humidity at ambient temperature, and then shirred.

A convenient plant for carrying out the process of the invention essentially has, as already noted, an extruder having an annular extrusion nozzle, means for feeding bulk material to the nozzle, means for drawing a former, particularly an inflated flexible tubular templet through the centre of the nozzle to receive a casing being formed by the nozzle, means for subjecting the casing while on the templet to strengthen it and improve its properties, and, preferably, means for removing the treated casing from the templet. Where separate lengths of templet tubing are to be used the plant has in addition means for connecting a series of templets end to end to allow continuous passage through the nozzle, means for parting the casing and disconnecting the templets from each other after passage through the nozzle and, preferably, means for storing a number of templets, after removal of the treated casings, until they are required for further passage through the nozzle. The templets are provided with connectors on which the connecting and disconnecting means act. The casing is conveniently parted at the connectors by means of a steam jet.

The connection and disconnection of the templets is preferably automatic and is readily made automatic if the connectors are co-operating slot and toggle devices at the leading and trailing ends, respectively, of the templets. The templets can then be drawn through the nozzle, and conveyed during treatment of the casing, by conveyors automatically taking them up be means of grippers or fingers co-operating with the connectors.

However many different plant arrangements can be set up. Extrusion is primarily described for example as taking place on a vertically-moving templet, but substantially horizontal movement is possible. Moreover, as already noted, the plant can be continuous.

Plant suitable for carrying out the process of the invention is schematically illustrated in the accompanying diagrammatic drawings in which:

FIG. 1 shows the extruder and setting bath;

FIG. 2 shows a continuous mechanical handling plant;

FIGS. 3a and 3b show respective side and end views of connectors used to join lengths of inflated tubing constituting the templets for passage through the extruder.

Figure 4:
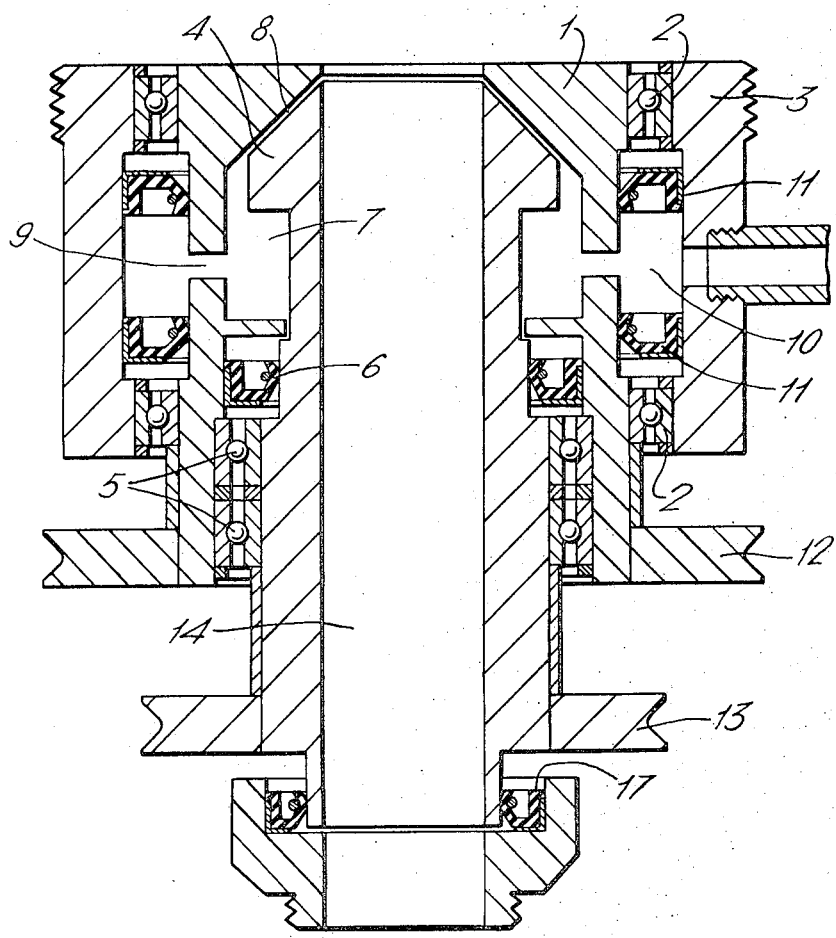
FIG. 4 shows the extruder alone.

The extruder as shown in FIG. 1 has a 45° outer cone 1 carried in bearings 2 in the head 3, the corresponding inner cone 4 being carried within the outer one on further bearings 5. The extrusion nozzle is constituted by the two cones, the gap between them being 20 thousandths of an inch (0.48 mm.) wide. A seal 6 is provided between the inner and outer cones and prevents escape of dough from a dough annulus 7 which feeds the gap 8 between the cones. The dough annulus is itself fed, through channels 9 in the outer cone, from a stationary feed annulus 10 which surrounds the cone and is sealed against it by seals 11. Concentric extensions 12, 13 of the cones take belt drives. Through the centre of the inner cone and its drive extension passes a bore 14 for the inflated tube 15 and an accompanying feed of setting solution. A seal 17 is provided to prevent escape of the setting solution, which is fed partly by the action of the moving templet tubing and partly by a low hydrostatic head, through a U-tube 18 or equivalent arrangement, such as a tank containing a guide-wheel. This setting solution is in contact with the inside of the casing being formed and also lubricates the passage of the templet tubing through the U-tube. Setting solution is pumped also to surround the outside of the casing, through an inlet 21, and over-flow pipes 19 and 22 are provided for it.

In FIG. 2 the extruder is indicated generally at 101. It is fed by an ordinary hydraulically operated sausage filler of 100 lbs. capacity, not shown. In use of the plant the inflated templet tubing is fed to the nozzle and emerges from it carrying a continuous extruded casing, which is set in a bath 102 containing setting solution. The tubing is pulled through the nozzle by a vertical driving chain 103 to which it is attached automatically by means of the connectors which join individual lengths of inflated tubing together, as described below. When a length of tubing reaches the top of the vertical conveyor it is picked up on a horizontal intermittent conveyor 104. Just before the length of tubing reaches the vertical conveyor an intermittent steam jet travelling with the conveyor and operating at 40 p.s.i.g. severs the extruded casing surrounding the connection with the next length, thus making possible the removal of the completed length. After removal, setting fluid from inside and outside the casing drains off and the completed lengths pass through drying, washing and redrying cabinets to firm the casing, the templets being held for the purpose between the horizontal conveyor already mentioned, and a bottom conveyor having slots which engage automatically with the connectors at the bottom ends of the templets. Forced draught drying with warm air is employed. After controlled rehumidification the finished casing is removed from the templets by shaped rubber pads on a vertical-chain shirring device 106 operating during a dwell in the conveyor movement, and the templets then pass, still on the conveyor 104, to an automatic release device (a finger on a rotating disc) which causes them to drop into a slotted storage chute 107. Here they are held, hanging vertically with the connectors engaged in the slot, to await reconnection at 108 for a further passage through the extrusion nozzle.

FIG. 3 shows the templet connectors, 201 for the top end or leading end of a length of tubing and 202 for the bottom end. They are fitted with hooks 203 and 204 to which the tubing is attached. The top-end connector has a flange 205 by means of which the connector is carried on the vertical conveyor 103 and a bore 206 through which a finger on the horizontal conveyor 104 passes. The flange 205 may simply be engaged between two fingers on the conveyor 103. Alternatively a cam-operated gripping device may be used to ensure that the flange is positively held and also that the casing cannot shirr back under its own weight when severed (above the flange) to allow removal of a finished length by conveyor 104. The slot 207 and toggle 208 construction of the connectors ensures that they can be connected and disconnected automatically during operation of the plant. Connection is effected by a light spring-loaded arm which presses the toggle of the trailing-end connector of one templet into the slot of the leading-end connector of a templet waiting in the chute 107; the waiting tubes are held properly oriented by engagement of the flange 205 of the connector with the slot of the chute. Disconnection occurs automatically when the vertical movement of a templet on the conveyor 103 ceases as the templet is carried away by conveyor 104, the toggle being freed to escape sideways by the continuing vertical movement of the next templet.

The design of the trailing-end connector allows a ready removal of the shirred casing as well as automatic connection and disconnection, an essential requirement for the plant described. It is possible to modify the trailing-end connector to incorporate an air valve, and it may be found desirable to do so if the templets tend to lose pressure slowly during use, or if it is found desirable to lower the pressure before the shirring.

The invention is illustrated by the following Example:

EXAMPLE

The extruder described above was used to produce a casing from a 6% dough of collagen from split hides, having an apparent viscosity of 60 poise, extruded at 100 p.s.i. (7 kg./sq. cm.) at 16° C. The inner cone was run at 80 r.p.m. and the outer at 90 r.p.m. Nylon 11 templet tubing of 28 mm. layflat size (about 18 mm. inflated diameter) and 0.06 mm. thick was used in 25 foot lengths inflated to a pressure of 12 inches (30 cm.) water gauge, and drawn through the extruder at 30 feet/min. (14.5 cm./sec.). The setting bath contained saturated brine, pumped continuously to surround the casing being formed and also passed with the templet tubing under a head sufficient, with the action of the moving tubing, to maintain a pressure at the extruder nozzle slightly above that exerted by the brine in the setting bath. The pressure of the brine so passed was enough to expand the casing being formed away from the templet for the first 1 or 2 inches (2 to 5 cm.) above the surface of the setting bath.

The lengths of templet tubing, once carrying a full length of extruded casing, were hung to drain and dry overnight. They were then washed for five minutes in sprays of cold water. After leaving overnight again to dry finally the casing was shirred to give 6½ inch shirred lengths (15.5 cm.) of strong translucent casing, about one thousandth of an inch (0.025 mm.) thick. After conditioning for a week at 20° C. in 80% relative humidity the casing was stuffed and twist linked; it had satisfactory strength without being tough to the consumer, and behaved satisfactorily during frying.

What is claimed is:

1. A process for the preparation of a tubular sausage casing of collagen from a collagen dough comprising the steps of:
    (i) forming the casing by extruding the collagen dough through an annular orifice defined by inner and outer rotatable conical members which rotate in opposite senses to one another, extrusion being carried out into a bath of collagen-setting solution
    (ii) while forming the casing, passing axially through said inner member into the bath of collagen-setting solution at a rate consistent with the rate of formation of said casing an erected flexible tubular body which conforms in external dimensions substantially to the dimensions of the casing required
    (iii) receiving the formed casing onto the erected flexible tubular body
    (iv) subjecting the casing to strengthening treatment by means of washing, drying and redrying while supported on the erected flexible tubular body
    (v) removing the strengthened casing from the erected flexible tubular body.

2. A process according to claim 1, in which the flexiblue tubular body is erected by inflation with air or other gas.

3. A process according to claim 2, in which the air or other gas is contained in a flexible lining tube within the flexible tubular body.

4. A process according to claim 1, in which the erected flexible tubular body is erected by means of a flexible, elastic polymer foam.

5. A process according to claim 1, in which the flexible tubular body is a tubular film of plastics material.

(References on following page)

References Cited

UNITED STATES PATENTS

| | | | |
|---|---|---|---|
| 1,036,839 | 8/1912 | Nusselblad | 99—176 |
| 1,348,459 | 8/1920 | Swett | 99—176 X |
| 1,548,504 | 8/1925 | Becker | 99—176 |
| 2,125,025 | 7/1938 | Nuckfeldt | 99—176 |
| 2,223,057 | 11/1940 | Bosel | 99—176 UX |
| 2,257,222 | 9/1941 | Bergmann | 99—176 UX |
| 3,122,788 | 3/1964 | Lieberman | 99—176 UX |
| 3,565,985 | 2/1971 | Schrenk | 425—131 |
| 1,654,253 | 12/1927 | Henderson | 99—176 |

FOREIGN PATENTS

| | | | |
|---|---|---|---|
| 4,532 | 1/1920 | Netherlands | 99—176 |
| 289,688 | 5/1928 | Great Britain | 99—176 |
| 473,004 | 3/1929 | Germany | 99—176 |
| 807,863 | 1/1959 | Great Britain | 99—176 |

ROBERT HALPER, Primary Examiner

U.S. Cl. X.R.

264—209; 425—131

UNITED STATES PATENT OFFICE
CERTIFICATE OF CORRECTION

Patent No. 3,816,632             Dated June 11, 1974

Inventor(s) Maxwell Charles Hamlyn, Allan James Kidney and Alexander Owen

It is certified that error appears in the above-identified patent and that said Letters Patent are hereby corrected as shown below:

Column 1, line 10, after "Ser. No. 115,133", add the following: --Claims priority - application Great Britain, July 14, 1967, 32451/67--.

Signed and sealed this 5th day of November 1974.

(SEAL)
Attest:

McCOY M. GIBSON JR.
Attesting Officer

C. MARSHALL DANN
Commissioner of Patents